July 4, 1950  T. DION  2,513,458
SAFETY BAYONET FASTENER FOR PRESSURE
COOKERS AND THE LIKE
Filed Aug. 29, 1947
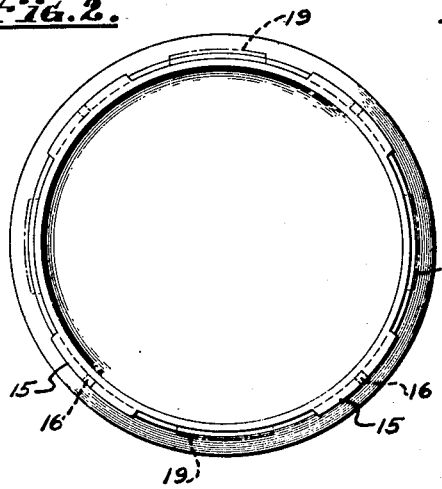
Fig. 2.
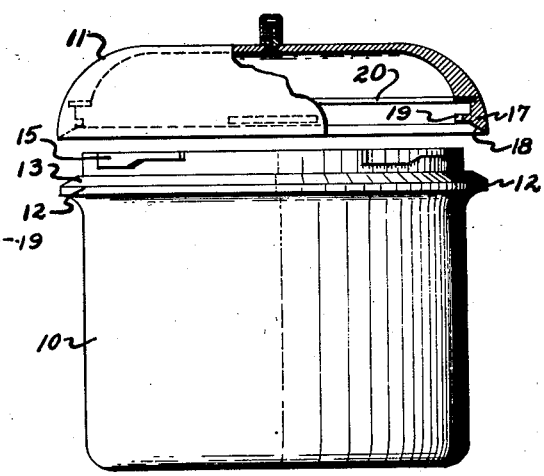
Fig. 1.
Fig. 7.
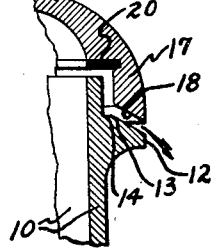
Fig. 8.
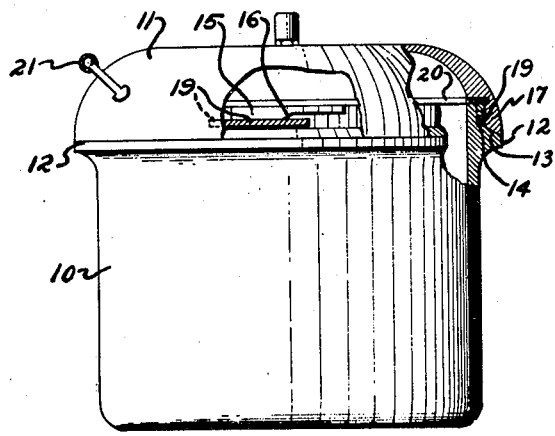
Fig. 3.
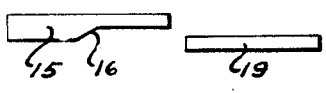
Fig. 4.
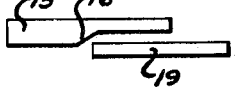
Fig. 5.
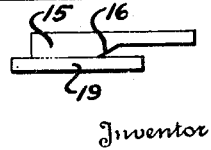
Fig. 6.
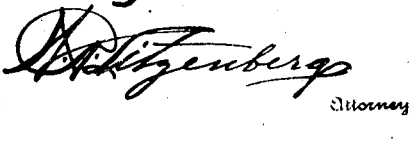
Inventor
Timothy Dion
By [signature]
Attorney Patented July 4, 1950

2,513,458

UNITED STATES PATENT OFFICE 2,513,458

SAFETY BAYONET FASTENER FOR PRESSURE COOKERS AND THE LIKE

Timothy Dion, Los Angeles, Calif.

Application August 29, 1947, Serial No. 771,236

2 Claims. (Cl. 220—40)

This invention relates to pressure cookers and the like, and has as its main object to provide a construction and arrangement wherein the cover, lid or cap for the mouth of the pressure chamber can be removed in stages in a way to prevent possible blow out of the steam pressure within the container.

It is not uncommon, in the use of pressure cookers, radiator caps and the like, for the attendant to remove the cover or cap and discover too late that there is great pressure therein and to be seriously burned by the steam blowing up in the face and hands. This is possible for the reason that the covers are usually turned relative to the body of the container and are released and can be blown off without warning. This has happened many times in the personal knowledge of the applicant herein.

Applicant has conceived the idea of providing a cover or cap for the mouth of a chamber or container in which steam is developed, which can be turned in stages, that is: a partial or initial turn of the cover relative to the body of the container will loosen the cover sufficiently to permit steam to escape thereunder, and by a further turn of said cover, it will be released so that it can be lifted from the mouth of the container.

Applicant has also provided a cover with a skirt portion which fits down over the outer side of the mouth of the container in such a way that escaping steam, after the cover has been loosened, will be directed downwardly and not upwardly toward the attendant.

In order to explain my invention in detail, I have shown it embodied in a pressure cooker on the accompanying sheet of drawings, which I will now describe.

Figure 1 is a side elevation of a pressure cooker embodying my invention, with the cover lifted;

Figure 2 is a plan view looking down into the body of the cooker, showing locking lugs around the top of said body, and also indicating in light dot and dash lines the positions of the locking lugs on the cover, if it were in place thereon and before turning it;

Figure 3 is a side elevation of the pressure cooker with cover locked in place thereon, and with portions broken out to show the cooperating construction between the body and cover;

Figures 4, 5 and 6 are details showing the relative positions of the locking lugs on the body and on the cover when moved into the different positions;

Figure 7 is a detail of two cooperating locking lugs, with a slight modification in the nature of a placement bump and socket on the meeting faces; and Figure 8 is a fragmentary sectional view to show the relationship of the cover and the body in the loosened position of the cover, and indicating how the steam is discharged downwardly and outwardly from beneath the skirt of the cover.

While I have shown my invention embodied in a pressure cooker, it will be understood that it can be embodied in other constructions wherein there is steam or other pressure, such as radiator caps, and where the removal of the cap or cover can be by stages in the manner now to be described.

In the drawings, the body of the cooker is designated 10, and the cover is designated 11. The body can be of any design and is shown having formed around its upper outer surface an annular flange, designated 12, and shown in section clearly in Fig. 3, said flange having a downwardly and outwardly tapering upper surface 13, and at the upper or inner end of which is a narrow flat bearing surface 14. This is also seen in Fig. 8.

Around the top outer edge of the mouth of said body are formed a plurality of locking lugs or lug members 15 of tapering form, as shown, with an angle or cam surface 16 therebetween, that is, between the wider part and the narrower part of each lug.

Around the inner lower side of the cover 11 is a thicker portion 17, having a downwardly tapering lower edge or skirt 18 to fit upon the tapering surface 13 on the body. Formed on the inner surface of said thicker portion of said cover are locking lugs, as 19, 19, positioned, when said cover is in place on said body, to be turned under the narrower portions of the locking lugs 15, and then to be turned under the thicker portions of said locking lugs, in a manner understood, the angle portion or surface 16 directing said lug 19 downwardly under the thicker portion of the lug 15, and thereby drawing the cover tighter and locking it in place, as clearly indicated on the drawings. It will be understood, of course, that as many of the locking lugs can be arranged around the mouth of the body as may be desired, and a corresponding number of lugs around the inside of the cover.

Secured in the cover 11 is a rubber or composition gasket 20, positioned to rest upon the upper edge of the body when the cover is in place, and to seal the joint formed between the cover and the body, as illustrated in Fig. 3. This feature is known in the art.

Any type of handles can be used for the cover and for the body, so that they can be readily turned relative to each other in the usual manner. I have shown a handle 21 on the cover for lifting it. There would be two of these handles.

The important feature of this invention is the provision of locking lugs on the body, around the mouth thereof, and on the cover so arranged and related that a two stage release is required, that is: an initial or partial turn of the cover will loosen it sufficiently to permit the escape of steam or other pressure downwardly without injuring the attendant, and a second turn or stage releases the cover to be lifted. In Figs. 4, 5 and 6, I have illustrated how the locking lugs operate. It will be remembered that the lugs 15 are on the body, while the lugs 19, are on the inside of the cover. As the cover is placed down upon the body, Fig. 4, the lugs 19, 19 of the cover are to the right of the lugs 15, 15 around the mouth of the body or container. The cover is turned clockwise to bring said lugs 19, 19 to the positions, as indicated in Fig. 5, and the further turning of said cover brings the lugs 19, 19, on the cover under the lugs 15, 15, on the body, and said cover is thus locked.

The danger comes when it is desired to remove the cover. With my improved locking means, the cover is turned initially, or the first stage, only to the position indicated in Fig. 5—the loosened position. This prevents the cover from being blown off, because the lugs 19, 19 will catch the narrower portions of the lugs 15, 15, as in Fig. 5 positions, and thus permit a loosening of the cover, as indicated in Fig. 8, and also permit the escape of steam pressure downwardly and outwardly, as indicated by the small arrows. This insures no injury to the hands and face of the attendant. After the pressure is expended, the cover can then be turned the second stage or to the position indicated in Fig. 4, and easily removed.

In Fig. 7, I have indicated how the meeting faces of the lugs 15 and 19 can be provided with a little bump and socket, as 22 and 23, to indicate the proper stop position, if this should be desired on any construction.

I do not limit the invention to the details of construction and arrangement used for explanatory purposes, or to its use on a pressure cooker, but intend that it shall be applicable to any container in which steam pressure is developed and in which there is a cover or cap to fit down over the mouth of the container, whatever it may be, all within the scope of the claims herewith.

I claim:
1. A pressure cooker having an annular flange portion around its outer upper portion with a downwardly and outwardly tapering bearing surface, a cover for said cooker having around its lower inner edge a correspondingly tapering surface to bear upon the tapering surface around said body when said cover is in place thereon, and locking means for said cover including a plurality of tapering lugs formed around the outer upper surface of said cooker above said flange portion, and a plurality of lugs formed around the inner lower edge of said cover to interlock with the lugs on said cooker when said cover is placed thereon and turned relative thereto, said lugs being of different thicknesses whereby said cover is tightened, loosened and released as it is turned to three different stages relative to said cooker.

2. A pressure cooker with cover therefor and locking means between said cover and said cooker, said cooker having around its outer upper portion an annular flange-like portion having a downwardly inclined bearing surface, said cover having around its lower edge a correspondingly tapering bearing surface to fit upon said bearing surface of said cooker when said cover is placed over said cooker, said locking means including a plurality of lug portions around the outer surface of said cooker above said flange-like portion, said lug portions having a wide and a narrow portion with an inclined surface therebetween, and a plurality of lug portions formed around the inner side of said cover to cooperate with the lugs on said cooker, when said cover is placed over said cooker and turned relative thereto, the narrow portions of the lugs on said body permitting said cover to be loosened when its lug portions are turned thereunder, whereby said cover can be turned to tight, loose and released positions on said cooker.

TIMOTHY DION.

REFERENCES CITED

The following references are of record in the file of this patent:

UNITED STATES PATENTS

| Number | Name | Date |
|---|---|---|
| 1,598,807 | Merry | Sept. 7, 1926 |
| 2,022,868 | Nelson | Dec. 3, 1935 |
| 2,101,756 | Saunders et al. | Dec. 7, 1937 |
| 2,177,123 | Wittenberg | Oct. 24, 1939 |
| 2,179,136 | Shoemaker | Nov. 7, 1939 |
| 2,201,314 | Illsley | May 21, 1940 |
| 2,218,188 | Wittenberg | Oct. 15, 1940 |
| 2,355,896 | Wyld | Aug. 15, 1944 |
| 2,399,115 | Hansen et al. | Apr. 23, 1946 |

FOREIGN PATENTS

| Number | Country | Date |
|---|---|---|
| 43,837 | Norway | Mar. 14, 1927 |
| 261,370 | Great Britain | Apr. 14, 1927 |
| 636,625 | France | Jan. 14, 1928 |